United States Patent
Liu (10) Patent No.: US 10,121,227 B1
(45) Date of Patent: Nov. 6, 2018

(54) METHOD AND SYSTEM OF RECONSTRUCTING VIDEOS BY USING SUPER-RESOLUTION ALGORITHM

(71) Applicant: ULSee Inc., Taipei (TW)

(72) Inventor: Yang Liu, HangZhou (CN)

(73) Assignee: ULSee Inc., Taipei (TW)

(*) Notice: Subject to any disclaimer, the term of this patent is extended or adjusted under 35 U.S.C. 154(b) by 0 days.

(21) Appl. No.: 15/709,558

(22) Filed: Sep. 20, 2017

(30) Foreign Application Priority Data

Aug. 31, 2017 (CN) .......................... 2017 1 0769711

(51) Int. Cl.
*G06T 3/40* (2006.01)
*H04N 7/01* (2006.01)
*G06T 5/50* (2006.01)

(52) U.S. Cl.
CPC .......... *G06T 3/4053* (2013.01); *G06T 3/4007* (2013.01); *G06T 5/50* (2013.01); *H04N 7/0117* (2013.01); *H04N 7/0125* (2013.01); *G06T 2207/10016* (2013.01); *G06T 2207/20081* (2013.01); *G06T 2207/20221* (2013.01)

(58) Field of Classification Search
CPC .......................................... G06T 2207/20221
See application file for complete search history.

(56) References Cited

U.S. PATENT DOCUMENTS

| 5,995,154 | A  | * | 11/1999 | Heimburger | H04N 7/012 348/448 |
| 7,496,236 | B2 | * | 2/2009  | Fogg       | G06T 1/20 382/232 |
| 8,300,146 | B2 | * | 10/2012 | Su         | H04N 7/014 348/452 |
| 8,537,276 | B2 | * | 9/2013  | Ueno       | H04N 9/8042 348/441 |

(Continued)

*Primary Examiner* — Paulos M Natnael
(74) *Attorney, Agent, or Firm* — Alan D. Kamrath; Kamrath IP Lawfirm, P.A.

(57) ABSTRACT

A method of reconstructing videos by using super-resolution algorithm includes the steps: (a) providing a video, wherein the video is composed of a plurality of frames having a sequence; (b) starting a first thread and a second thread, the first thread performing a first algorithm and the second thread performing a second algorithm for improving resolution, wherein a time complexity of the first algorithm is greater than a time complexity of the second algorithm; (c) the first thread sequentially reading the frames of the video in units of a first interval and processing the frames in order to obtain first processed frames, and the second thread sequentially reading the frames of the video in units of a second interval and processing the frames in order to obtain second processed frames, wherein a value of the first interval is an integer greater than 1, and a value of the second interval is 1; (d) performing a fusion operation on the second processed frames which is processed by the second thread and the nearest first processed frames which is processed by the first thread in order to obtain a plurality of fusion frames; and (e) displaying the plurality of fusion frames according to (Continued)

the sequence. The present disclosure can solve the problem that video super-resolution in real-time, computing time and resolution are difficult to be taken into account simultaneously.

12 Claims, 4 Drawing Sheets

(56) References Cited

U.S. PATENT DOCUMENTS

| | | | |
|---|---|---|---|
| 8,643,776 B2* | 2/2014 | Chang | G09G 3/3611 348/441 |
| 9,355,434 B2* | 5/2016 | Dupret | G06T 3/4053 |
| 9,547,887 B2* | 1/2017 | Liang | G06T 3/4076 |
| 2012/0314037 A1* | 12/2012 | Nehmadi | G01C 11/06 348/48 |
| 2015/0093015 A1* | 4/2015 | Liang | G06T 3/4076 382/154 |
| 2015/0213579 A1* | 7/2015 | Alacoque | G06T 3/4053 382/300 |

* cited by examiner

METHOD AND SYSTEM OF RECONSTRUCTING VIDEOS BY USING SUPER-RESOLUTION ALGORITHM

FIELD OF THE DISCLOSURE

The present disclosure relates to methods and systems of reconstructing videos by using super-resolution algorithm, and more particularly to methods and systems of reconstructing videos by use of two threads having different time complexities for processing videos.

BACKGROUND OF THE INVENTION

With the rapid development of network technology and display technology, video resolution requirement for market are getting higher and higher, especially for current popular network real-time playback, it's an important topic for relevant industry for stably providing high-resolution videos.

At present, the most commonly-used technologies are to improve resolution through interpolation or super-resolution reconstruction technology. Compared these two commonly-used technologies, the super-resolution reconstruction technology is more able to maintain original resolution while preventing clarity from declining. Current video resolution technology usually improves resolution by performing a fusion operation on low-resolution images.

However, the above technology can effectively maintain or improve the resolution of the video, but the super-resolution technology with better effect usually has higher time complexity, which means that you need more transmission time. This is not easy for transmitting videos to mobile devices, especially for real-time videos, which will be a big challenge for mobile devices.

Hence, how to provide methods and systems of reconstructing videos by using super-resolution algorithm capable of solving the abovementioned problems has become an important topic for the person skilled in the art.

SUMMARY OF THE INVENTION

In view of the above-mentioned problems, methods and systems of reconstructing videos by using super-resolution algorithm are provided in the present disclosure. Two threads having different time complexities are used for processing the video, and a fusion operation is used for combining the frames of the video processed by these two different threads. The present disclosure can solve the problem that video super-resolution in real-time, computing time and resolution are difficult to be taken into account simultaneously.

It is one objective of the present disclosure to provide a method of reconstructing videos by using super-resolution algorithm.

According to one exemplary embodiment of the present disclosure, a method of reconstructing videos by using super-resolution algorithm is provided. The method includes the following steps: (a) providing a video, wherein the video is composed of a plurality of frames having a sequence; (b) starting a first thread and a second thread, the first thread performing a first algorithm and the second thread performing a second algorithm for improving resolution, wherein a time complexity of the first algorithm is greater than a time complexity of the second algorithm; (c) the first thread sequentially reading the frames of the video in units of a first interval and processing the frames in order to obtain first processed frames, and the second thread sequentially reading the frames of the video in units of a second interval and processing the frames in order to obtain second processed frames, wherein a value of the first interval is an integer greater than 1, and a value of the second interval is 1; (d) performing a fusion operation on the second processed frames which is processed by the second thread and the nearest first processed frames which is processed by the first thread in order to obtain a plurality of fusion frames; and (e) displaying the plurality of fusion frames according to the sequence.

In one example, the method further includes the following step between the step (d) and the step (e): storing the plurality of fusion frames until the video ends.

In one example, the video in the step (a) is a real-time video; and in the step (e), each of the plurality of fusion frames obtained in the step (d) is displayed in real-time.

In one example, the following formula is used for obtaining the fusion frames in the step (d):

$$F_{2F} = A \cdot F_{1H} + B \cdot F_{2L};$$

wherein $F_{2L}$ represents the second processed frames which is processed by the second thread, $F_{1H}$ represent the first processed frames which is processed by the first thread and nearest to the second processed frames $F_{2L}$, A, B$\in R^{m \times n}$, and A and B meet the following relationship:

$$\begin{cases} A + B = I \\ B = f(|F_{2L} - F_{1L}|) \end{cases};$$

wherein $F_{1L}$ and $F_{1H}$ correspond to a same original frame, $F_{1L}$ is obtained from processing the original frame by the second thread, I is an m×n matrix with all elements of 1, and the function f(x) is expressed as follows:

$$f(x) = \frac{1}{1 + e^{-a(x+b)}}.$$

In one example, values of a and b are expressed by the following relationship:

$$\begin{cases} a = \dfrac{1}{\text{var}(|F_{2L} - F_{1L}|)} \\ b = 0.03 + \dfrac{\log\left(\dfrac{1}{0.97} - 1\right)}{a} \end{cases}.$$

In one example, f(0.03)=0.97.

In one example, the first algorithm is a deep-learning-based super-resolution algorithm, and the second algorithm is a bi-cubic interpolation.

It is one objective of the present disclosure to provide a system of reconstructing videos by using super-resolution algorithm.

According to one exemplary embodiment of the present disclosure, a system of reconstructing videos by using super-resolution algorithm is provided. The system includes a video providing module, a thread starting module, a first thread, a second thread, a fusion operation module, and a displaying module. The video providing module is used for providing a video, wherein the video is composed of a plurality of frames having a sequence. The thread starting module is used for starting a first thread and a second thread, the first thread performing a first algorithm and the second thread performing a second algorithm for improving resolution, wherein a time complexity of the first algorithm is greater than a time complexity of the second algorithm. The first thread is used for sequentially reading the frames of the video in units of a first interval and processing the frames in order to obtain first processed frames. The second thread is used for sequentially reading the frames of the video in units of a second interval and processing the frames in order to obtain second processed frames, wherein a value of the first interval is an integer greater than 1, and a value of the second interval is 1. The fusion operation module is used for performing a fusion operation on the second processed frames which is processed by the second thread and the nearest first processed frames which is processed by the first thread in order to obtain a plurality of fusion frames. The displaying module is used for displaying the plurality of fusion frames according to the sequence.

These and other objectives of the present disclosure will no doubt become obvious to those of ordinary skill in the art after reading the following detailed description of the preferred embodiment that is illustrated in the various figures and drawings.

DESCRIPTION OF THE PREFERRED EMBODIMENTS

Certain terms are used throughout the following descriptions and claims to refer to particular system components. As one skilled in the art will appreciate, manufacturers may refer to a component by different names. This document does not intend to distinguish between components that differ in name but not differ in functionality. In the following discussion and in the claims, the terms "include", "including", "comprise", and "comprising" are used in an open-ended fashion, and thus should be interpreted to mean "including, but not limited to . . . ." The terms "couple" and "coupled" are intended to mean either an indirect or a direct electrical connection. Thus, if a first device couples to a second device, that connection may be through a direct electrical connection, or through an indirect electrical connection via other devices and connections.

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

The methods and systems of reconstructing videos by using super-resolution algorithm of the present disclosure utilize two threads having different tie complexities to process videos, and utilize a fusion operation for combining the frames of the video processed by these two different threads, so as to achieve reconstruction video effect. The methods and systems of reconstructing videos by using super-resolution algorithm of the present disclosure can be effectively applied to mobile devices.

Figure 1:
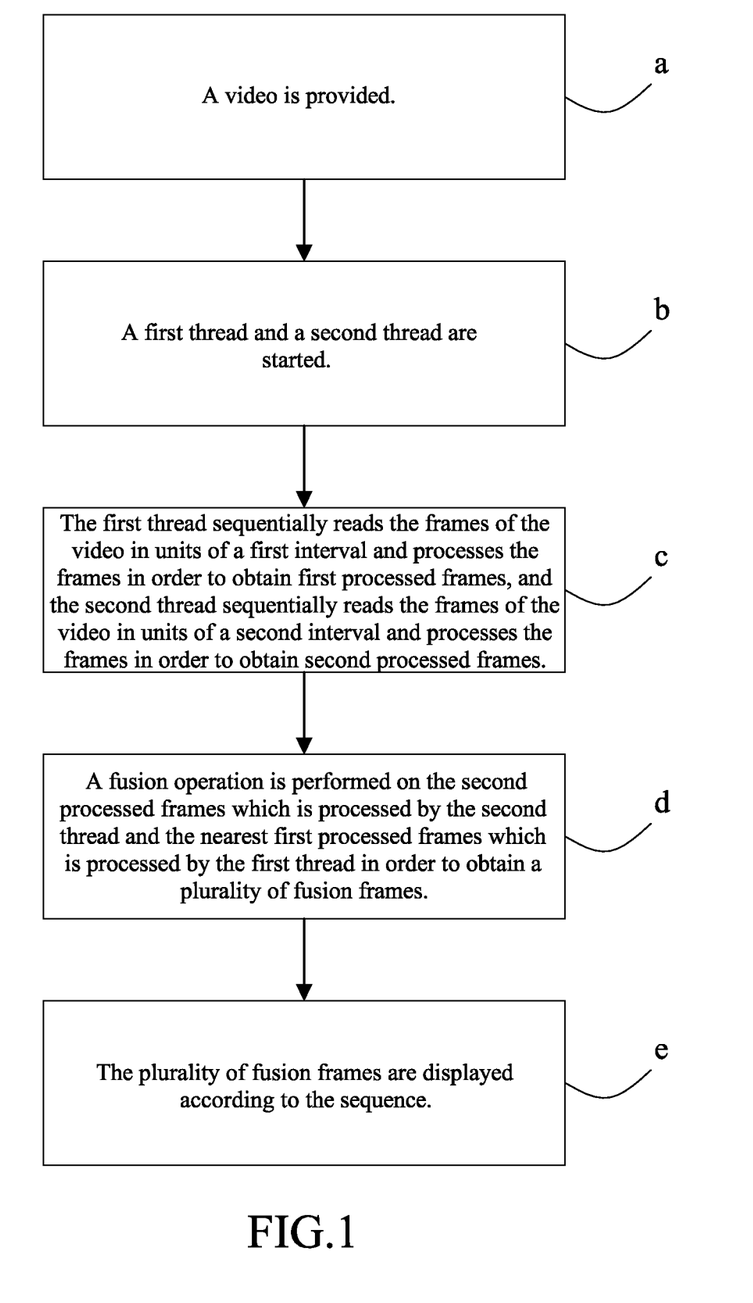
FIG. 1 is a flowchart illustrating the procedures of a method of reconstructing videos by using super-resolution algorithm according to an embodiment of the present disclosure.
Figure 2:
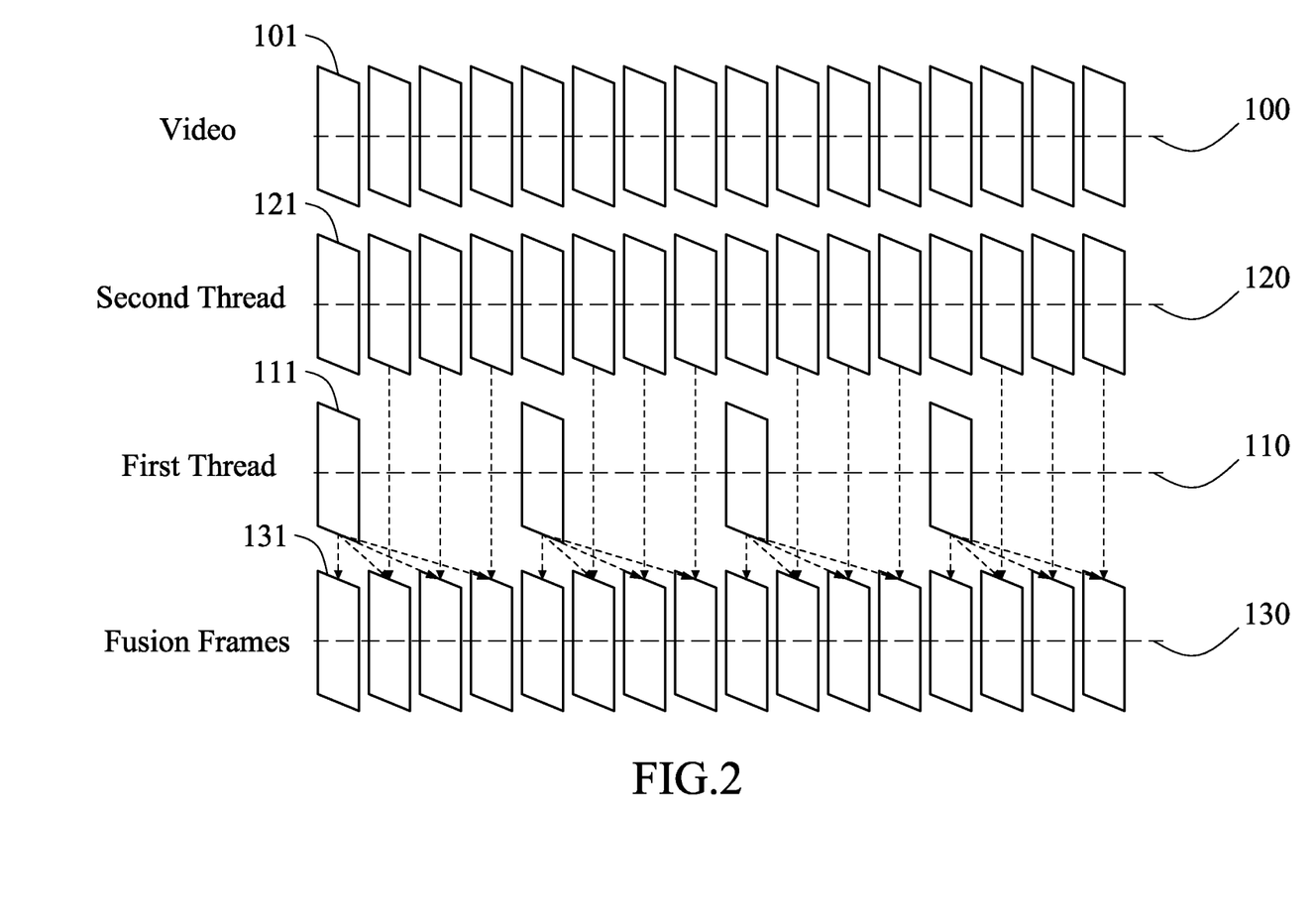
FIG. 2 is a schematic diagram of reconstructing a video.

Please refer to FIG. 1 and FIG. 2. FIG. 1 is a flowchart illustrating the procedures of a method of reconstructing videos by using super-resolution algorithm according to an embodiment of the present disclosure, and FIG. 2 is a schematic diagram of reconstructing a video. First, in the step (a), a video 100 is provided, wherein the video 100 is composed of a plurality of frames 101 having a sequence. In the step (b), a first thread 110 and a second thread 120 are started, the first thread 110 performing a first algorithm and the second thread 120 performing a second algorithm for improving resolution, wherein a time complexity of the first algorithm is greater than a time complexity of the second algorithm. In other words, the first thread 110 and the second thread 120 utilize different algorithms having different time complexities to process the plurality of frames 101 of the video 100, respectively. The time complexity of the first algorithm adopted by the first thread 110 is greater than the time complexity of the second algorithm adopted by the second thread 120.

Next, in the step (c), the first thread 110 sequentially reads the frames 101 of the video 110 in units of a first interval and processes the frames 101 in order to obtain first processed frames 111, and the second thread 120 sequentially reads the frames 101 of the video 110 in units of a second interval and processes the frames 101 in order to obtain second processed frames 121, wherein a value of the first interval is an integer greater than 1, and a value of the second interval is 1. That is to say, the time complexity of the first thread 110 is more complex, and it is impossible to process each frame 101 of the vide 100 one by one, so that the first interval is set for processing a specific frame 101 in the video 100. In the example of FIG. 2, the first interval is 4. The time complexity of the second thread 120 is much lower, and thus each frame 101 of the video 100 can be processed. In the example of FIG. 2, the second interval is 1.

In the step (d), a fusion operation is performed on the second processed frames 121 which is processed by the second thread 120 and the nearest first processed frames 111 which is processed by the first thread 110 in order to obtain a plurality of fusion frames 131. In this example, a plurality of second processed frames 121 is generated after the video 100 is processed by the second thread 120, and the resolution of these second processed frames 121 may be lower. A plurality of first processed frames 111 is generated after the video 100 is processed by the first thread 110, and the number of the first processed frames 111 is less than the number of the second processed frames 121 but the resolution of the first processed frames 111 is higher. Hence, by performing a fusion operation on the second processed frames 121 and the nearest first processed frames 111, the frames 131 with high resolution can be obtained, wherein the resolution of the frames 131 will be close to the resolution of the frames 101 of the original video 100. In some examples, a correction may be performed on the first processed frames 111 and the second processed frames 121 before the fusion operation.

The formula for the above fusion operation is as follow:

$$F_{2F} = A \cdot F_{1H} + B \cdot F_{2L}.$$

$F_{2L}$ represents the second processed frames 121 which is processed by the second thread 120, $F_{1H}$ represent the first processed frames 111 which is processed by the first thread 110 and nearest to the second processed frames $F_{2L}$, wherein $F_{1H}$, $F_{2L} \in R^{m \times n}$, which represents a pixel matrix of the frame image luminance channel.

A, B$\in R^{m \times n}$, and A and B meet the following relationship $$\begin{cases} A + B = I \\ B = f(|F_{2L} - F_{1L}|) \end{cases};$$

wherein $F_{1L}$ and $F_{1H}$ correspond to a same original frame 101, $F_{1L}$ is the second processed frames 121 obtained from processing the original frame 101 by the second thread 120, I is an m×n matrix with all elements of 1, and the function f(x) is expressed as follows:

$$f(x) = \frac{1}{1 + e^{-a(x+b)}}.$$

Figure 3A:
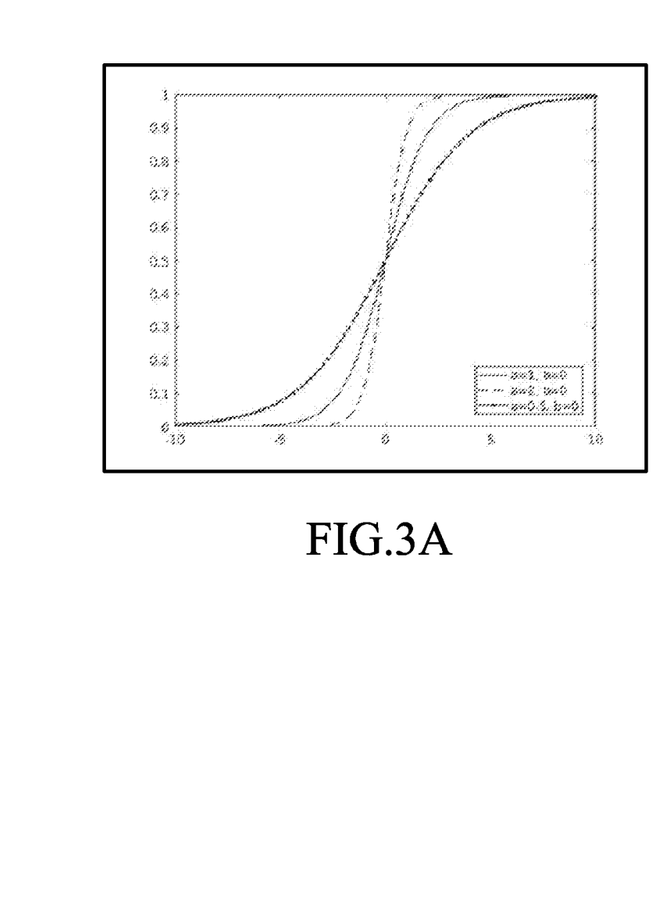
FIG. 3A and FIG. 3B are diagrams showing curves of a function f(x).
Figure 3B:
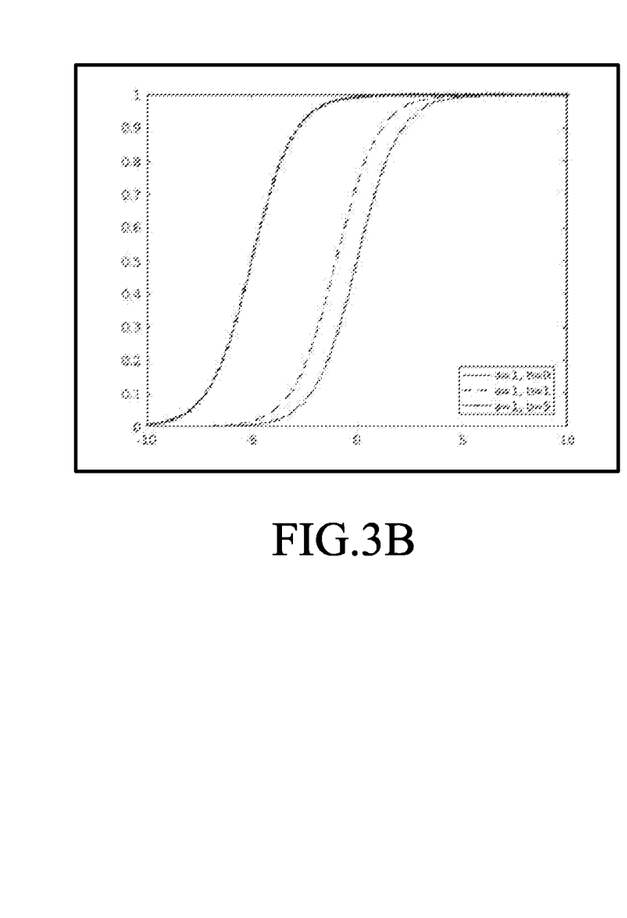

Please refer to FIG. 3A and FIG. 3B. FIG. 3A and FIG. 3B are diagrams showing curves of a function f(x). In the function f(x), the values of a and b will affect the smoothness of the function f(x) and the displacement in the x direction. The values of a and b can be expressed by the following relationship:

$$\begin{cases} a = \dfrac{1}{\mathrm{var}(|F_{2L} - F_{1L}|)} \\ b = 0.03 + \dfrac{\log\left(\dfrac{1}{0.97} - 1\right)}{a} \end{cases}.$$

That is, a is inversely proportional to the variance of the difference between two frames, and then a solution for b is sought in order to make f(0.03)=0.97.

Through the calculation of the above formula, fusion operations are successively performed on the second processed frames 121 and the first processed frames 111 to generate the plurality of fusion frames 131.

In the step (e), the plurality of fusion frames 131 are displayed according to the sequence, which forms a converted video 130.

In an example, a storage is used for storing the plurality of fusion frames 131 until the video 100 ends between the step (d) and the step (e).

In some embodiments, the video 100 in the step (a) is a real-time video; and in the step (e), each of the plurality of fusion frames 131 obtained in the step (d) is displayed in real-time. In other words, the converted video 130 is a real-time video on live.

Figure 4:
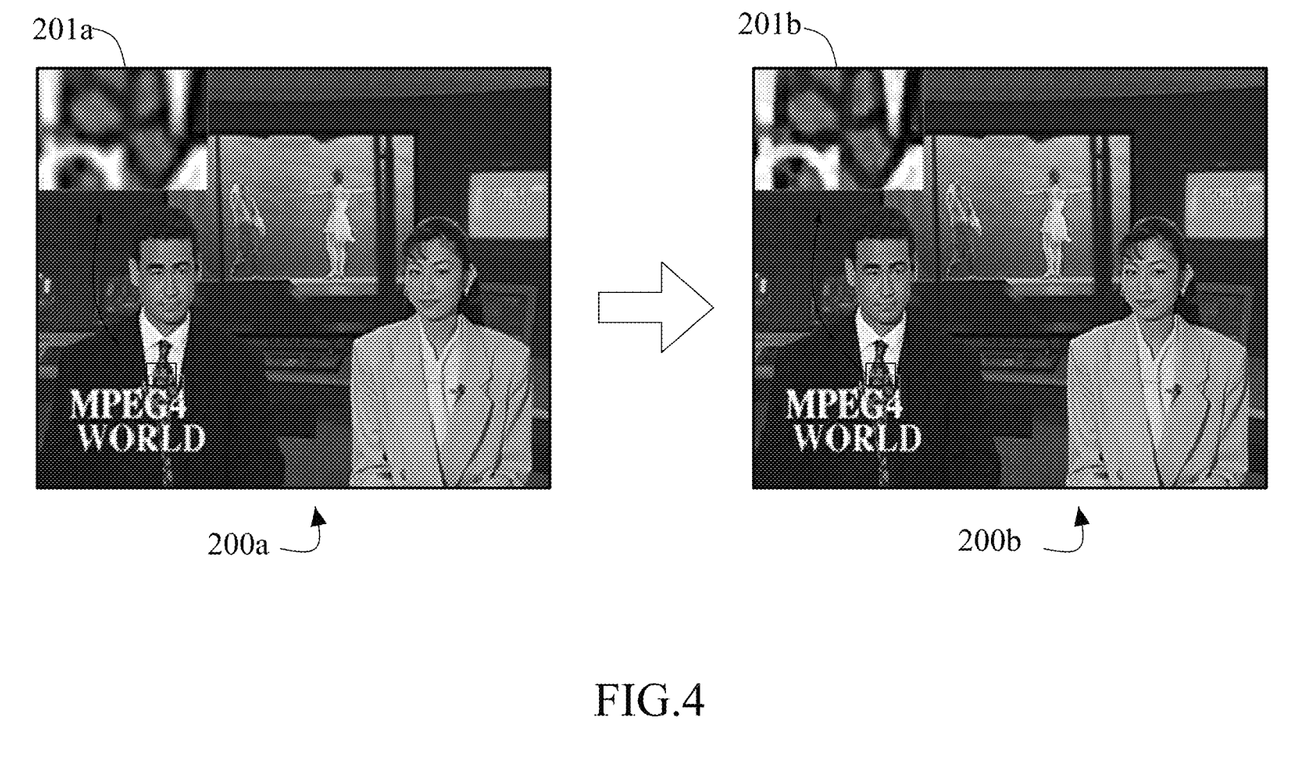
FIG. 4 is a schematic diagram of video conversion.

Please refer to FIG. 4. FIG. 4 is a schematic diagram of video conversion. In this embodiment, the first algorithm adopted by the first thread 110 is a deep-learning-based super-resolution algorithm, and the second algorithm adopted by the second thread 120 is a bi-cubic interpolation. The left sub-FIG. 200a of FIG. 4 shows the frames 121 resulted from a bi-cubic interpolation, which can be seen that the detail pattern in the block 201a has a lower resolution. The right sub-FIG. 200b of FIG. 4 shows the fusion frames 131 obtained by performing a fusion operation on the first processed frames 111 and the second processed frames 121, which can be seen that the resolution of the detail pattern in the block 201b is greatly improved.

According to one exemplary embodiment of the present disclosure, a system of reconstructing videos by using super-resolution algorithm is provided. The system includes a video providing module, a thread starting module, a first thread, a second thread, a fusion operation module, and a displaying module. The video providing module is used for providing a video, wherein the video is composed of a plurality of frames having a sequence. The thread starting module is used for starting a first thread and a second thread, the first thread performing a first algorithm and the second thread performing a second algorithm for improving resolution, wherein a time complexity of the first algorithm is greater than a time complexity of the second algorithm. The first thread is used for sequentially reading the frames of the video in units of a first interval and processing the frames in order to obtain first processed frames. The second thread is used for sequentially reading the frames of the video in units of a second interval and processing the frames in order to obtain second processed frames, wherein a value of the first interval is an integer greater than 1, and a value of the second interval is 1. The fusion operation module is used for performing a fusion operation on the second processed frames which is processed by the second thread and the nearest first processed frames which is processed by the first thread in order to obtain a plurality of fusion frames. The displaying module is used for displaying the plurality of fusion frames according to the sequence.

By adopting the methods and systems of reconstructing videos by using super-resolution algorithm of the present disclosure, the problem that video super-resolution in real-time, computing time and resolution are difficult to be taken into account simultaneously can be solved. The frames (such as the first processed frames 111) with larger interval and higher resolution being obtained by using high time complexity can be used as a frame sequence reference, and the real-time playback frames (such as the second processed frames 121) being obtained by using low time complexity can be merged with the first processed frames 111 in order to obtain a processing effect with a better resolution.

Reference in the specification to "one example" or "an example" means that a particular feature, structure, or characteristic described in connection with the example is included in at least an implementation. The appearances of the phrase "in one example" in various places in the specification are not necessarily all referring to the same example. Thus, although examples have been described in language specific to structural features and/or methodological acts, it is to be understood that claimed subject matter may not be limited to the specific features or acts described. Rather, the specific features and acts are disclosed as sample forms of implementing the claimed subject matter.

The above are only preferred examples of the present disclosure is not intended to limit the present disclosure within the spirit and principles of the present disclosure, any changes made, equivalent replacement, or improvement in the protection of the present disclosure should contain within the range.

Those skilled in the art will readily observe that numerous modifications and alterations of the device and method may be made while retaining the teachings of the invention. Accordingly, the above disclosure should be construed as limited only by the meters and bounds of the appended claims.

What is claimed is:

1. A method of reconstructing videos by using super-resolution algorithm, comprising:

(a) providing a video, wherein the video is composed of a plurality of frames having a sequence;
(b) starting a first thread and a second thread, the first thread performing a first algorithm and the second thread performing a second algorithm for improving resolution, wherein a time complexity of the first algorithm is greater than a time complexity of the second algorithm;
(c) the first thread sequentially reading the frames of the video in units of a first interval and processing the frames in order to obtain first processed frames, and the second thread sequentially reading the frames of the video in units of a second interval and processing the frames in order to obtain second processed frames, wherein a value of the first interval is an integer greater than 1, and a value of the second interval is 1;
(d) performing a fusion operation on the second processed frames which is processed by the second thread and the nearest first processed frames which is processed by the first thread in order to obtain a plurality of fusion frames; and
(e) displaying the plurality of fusion frames according to the sequence;
wherein the following formula is used for obtaining the fusion frames in the step (d):

$$F_{2F} = A \cdot F_{1H} + B \cdot F_{2L};$$

wherein $F_{2L}$ represents the second processed frames which is processed by the second thread, F1H represent the first processed frames which is processed by the first thread and nearest to the second processed frames $F_{2L}$, A, $B \in R^{m \times n}$, and A and B meet the following relationship:

$$\begin{cases} A + B = I \\ B = f(|F_{2L} - F_{1L}|) \end{cases};$$

wherein $F_{1L}$ and $F_{1H}$ correspond to a same original frame, F1L is obtained from processing the original frame by the second thread, I is an m×n matrix with all elements of 1, and the function f(x) is expressed as follows:

$$f(x) = \frac{1}{1 + e^{-a(x+b)}}.$$

2. The method of reconstructing videos by using super-resolution algorithm according to claim 1, further comprising the following step between the step (d) and the step (e): storing the plurality of fusion frames until the video ends.

3. The method of reconstructing videos by using super-resolution algorithm according to claim 1, wherein the video in the step (a) is a real-time video; and in the step (e), each of the plurality of fusion frames obtained in the step (d) is displayed in real-time.

4. The method of reconstructing videos by using super-resolution algorithm according to claim 1, wherein values of a and b are expressed by the following relationship:

$$\begin{cases} a = \frac{1}{\text{var}(|F_{2L} - F_{1L}|)} \\ b = 0.03 + \frac{\log\left(\frac{1}{0.97} - 1\right)}{a} \end{cases}.$$

5. The method of reconstructing videos by using super-resolution algorithm according to claim 4, wherein f(0.03)=0.97.

6. The method of reconstructing videos by using super-resolution algorithm according to claim 1, wherein the first algorithm is a deep-learning-based super-resolution algorithm, and the second algorithm is a bi-cubic interpolation.

7. A system of reconstructing videos by using super-resolution algorithm, the system comprising:
a video providing module, used for providing a video, wherein the video is composed of a plurality of frames having a sequence;
a thread starting module, used for starting a first thread and a second thread, the first thread performing a first algorithm and the second thread performing a second algorithm for improving resolution, wherein a time complexity of the first algorithm is greater than a time complexity of the second algorithm;
the first thread, used for sequentially reading the frames of the video in units of a first interval and processing the frames in order to obtain first processed frames;
the second thread, used for sequentially reading the frames of the video in units of a second interval and processing the frames in order to obtain second processed frames, wherein a value of the first interval is an integer greater than 1, and a value of the second interval is 1;
a fusion operation module, used for performing a fusion operation on the second processed frames which is processed by the second thread and the nearest first processed frames which is processed by the first thread in order to obtain a plurality of fusion frames; and
a displaying module, used for displaying the plurality of fusion frames according to the sequence;
wherein the fusion operation module adopts the following formula for obtaining the fusion frames:

$$F_{2F} = A \cdot F_{1H} + B \cdot F_{2L};$$

wherein $F_{2L}$ represents the second processed frames which is processed by the second thread, $F_{1H}$ represent the first processed frames which is processed by the first thread and nearest to the second processed frames $F_{2L}$, A, $B \in R^{m \times n}$, and A and B meet the following relationship:

$$\begin{cases} A + B = I \\ B = f(|F_{2L} - F_{1L}|) \end{cases};$$

wherein $F_{1L}$ and $F_{1H}$ correspond to a same original frame, $F_{1L}$ is obtained from processing the original frame by the second thread, I is an m×n matrix with all elements of 1, and the function f(x) is expressed as follows:

$$f(x) = \frac{1}{1 + e^{-a(x+b)}}.$$

8. The system of reconstructing videos by using super-resolution algorithm according to claim 7, further comprising:
a storage, used for storing the plurality of fusion frames until the video ends.

9. The system of reconstructing videos by using super-resolution algorithm according to claim 7, wherein the video provided by the video providing module is a real-time video;

and each of the plurality of fusion frames obtained by the fusion operation module is displayed in real-time.

10. The system of reconstructing videos by using super-resolution algorithm according to claim 7, wherein values of a and b are expressed by the following relationship:

$$\begin{cases} a = \dfrac{1}{\text{var}(|F_{2L} - F_{1L}|)} \\ b = 0.03 + \dfrac{\log\left(\dfrac{1}{0.97} - 1\right)}{a} \end{cases}.$$

11. The system of reconstructing videos by using super-resolution algorithm according to claim 10, wherein f(0.03)=0.97.

12. The system of reconstructing videos by using super-resolution algorithm according to claim 7, wherein the first algorithm is a deep-learning-based super-resolution algorithm, and the second algorithm is a bi-cubic interpolation.

* * * * *